Oct. 21, 1952     N. C. KOESTER ET AL     2,614,775
CASTERABLE AIRPLANE WHEEL
Filed Sept. 6, 1949     3 Sheets-Sheet 1
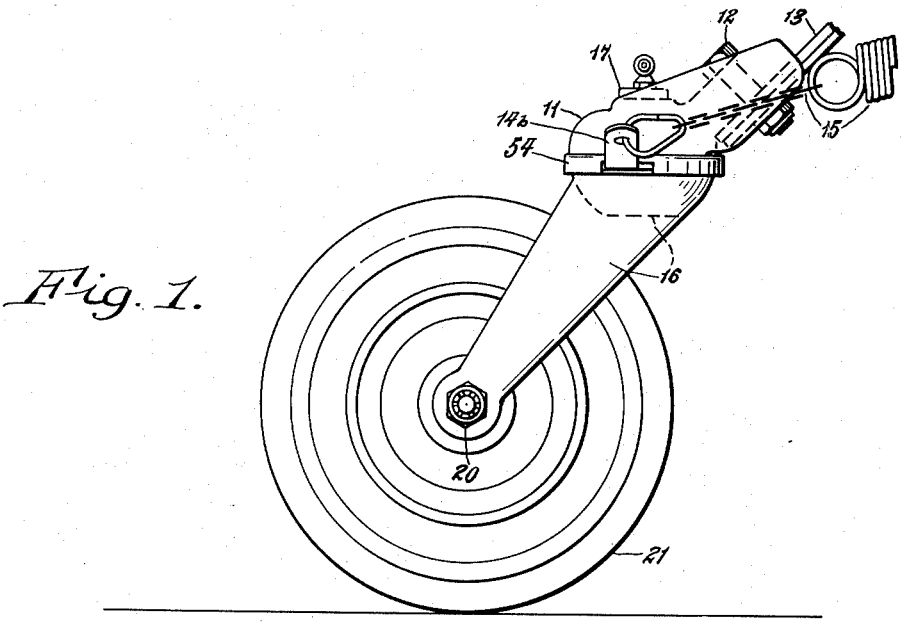
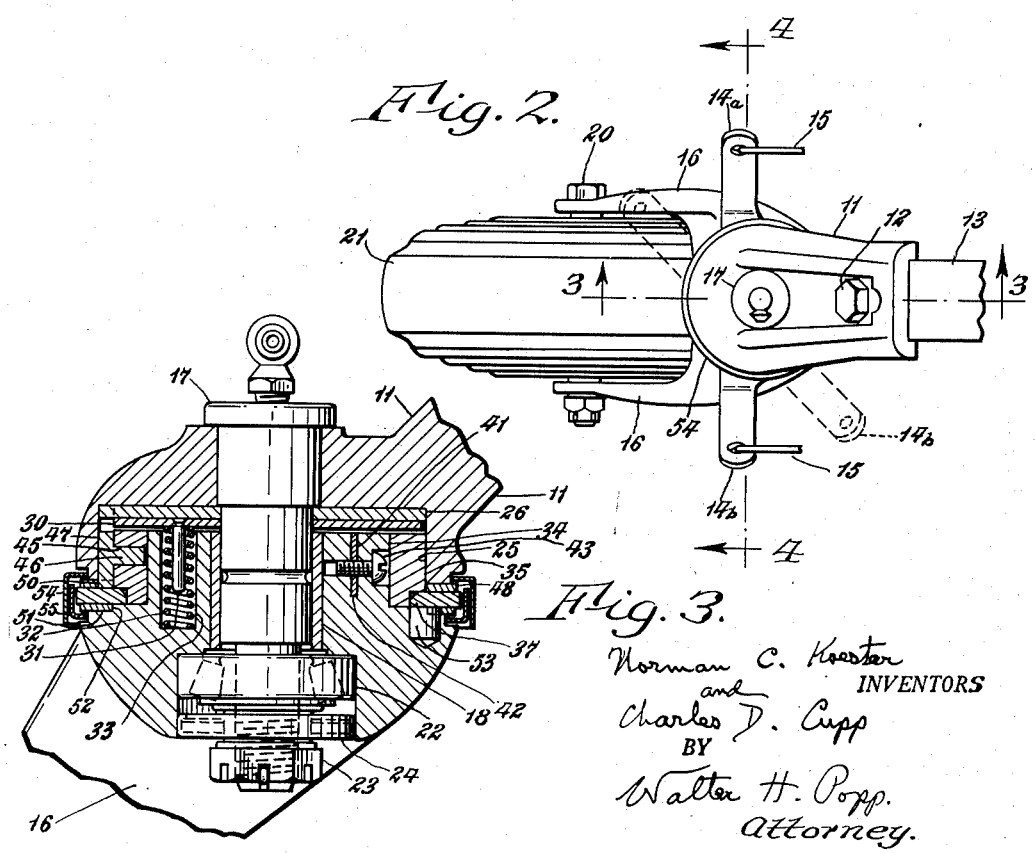
Norman C. Koester
and
Charles D. Cupp
INVENTORS
BY
Walter H. Popp.
Attorney.

Oct. 21, 1952
N. C. KOESTER ET AL
2,614,775
CASTERABLE AIRPLANE WHEEL
Filed Sept. 6, 1949
3 Sheets-Sheet 2
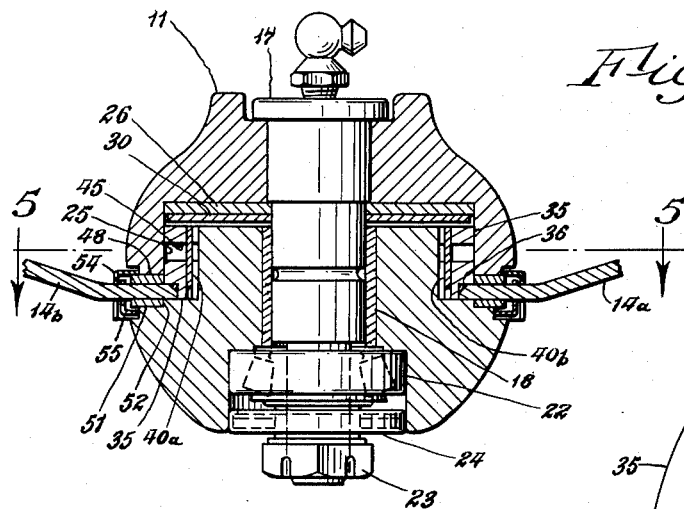
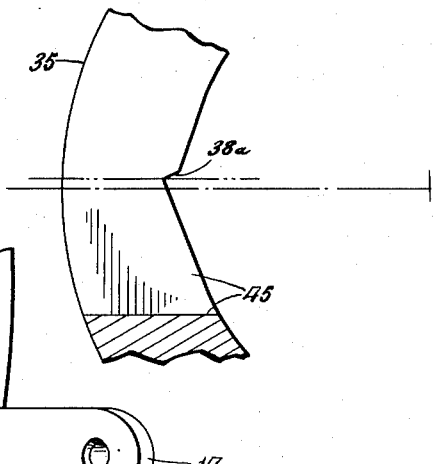
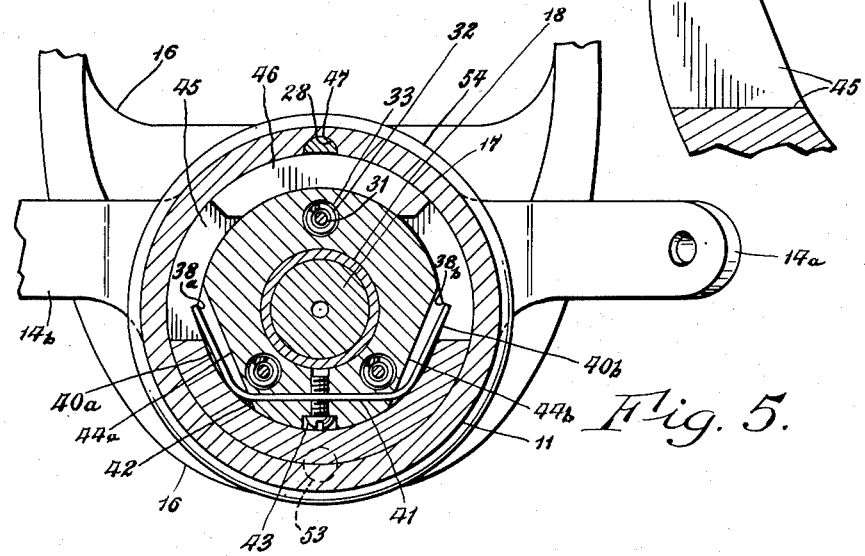
Norman C. Koester
and
Charles D. Cupp
INVENTORS
BY
Walter H. Popp.
Attorney.

Patented Oct. 21, 1952

2,614,775

UNITED STATES PATENT OFFICE 2,614,775

CASTERABLE AIRPLANE WHEEL

Norman C. Koester and Charles D. Cupp, Lancaster, N. Y., assignors to Scott Aviation Corporation, Lancaster, N. Y.

Application September 6, 1949, Serial No. 114,232

9 Claims. (Cl. 244—50)

This invention relates to a steerable and automatically casterable airplane wheel, for use as the tail wheel of a conventional airplane, or as the nose wheel of an airplane having a tricycle landing gear.

The objects of the invention are:

a. To provide an automatic coupling mechanism (between the steering arms and the fork which carries the wheel) that will have maximum strength and minimum weight, and still enable the engagement or disengagement of the coupling mechanism to be effected with very little expenditure of energy.

b. To provide a neat and compact airplane wheel of this character which may be manufactured inexpensively with generous dimensional tolerances, and which may be properly disassembled or assembled in the field by an unskilled worker.

c. To provide a steerable, automatically, casterable airplane wheel which may be conventionally manufactured to unlatch at whatever angle may be desired by the customer.

Other detailed objects of the invention and solutions thereof are disclosed in the specification and in the appended drawings, wherein:

Fig. 1 is a diminutive, side elevation of the entire wheel assembly shown mounted on a conventional leaf spring and with its steering arms connected to a pair of conventional spring connectors.

Fig. 2 is a diminutive top plan thereof.

Fig. 3 is a fragmentary, vertical, longitudinal section, thru the wheel assembly, taken on line 3—3 Fig. 2.

Fig. 4 is a fragmentary, vertical, transverse section thereof, taken on line 4—4 Fig. 2.

Fig. 5 is a fragmentary, horizontal section thereof, taken on line 5—5 Fig. 4.

Fig. 6 is an enlarged, fragmentary, horizontal section thru one side of the steering collar, showing one of the latching notches.

Similar characters of reference indicate like parts in the several figures of the drawings.

Figs. 1 and 2 illustrate the present invention used as a tail wheel in a conventional airplane, its bracket 11 being secured by a bolt 12 to the rear end of a conventional leaf spring 13, the latter being secured at its front end (by means not shown) to the rear, lower end of the airplane's fuselage in the usual and well known manner.

It is to be understood that the wheel assembly constituting the present invention may be connected to the tail end of the airplane in any other desired manner than that just described, or it may be connected to the front, lower face of the fuselage to act as the nose wheel of a tricycle landing gear.

Figure 7:
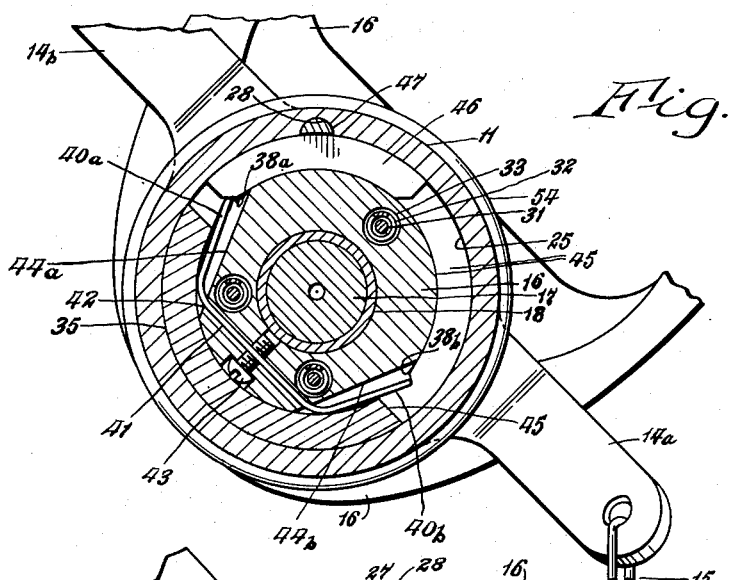
Fig. 7 is a fragmentary, horizontal section thru the wheel assembly, similar to Fig. 5 but with the steering arms and fork shown as having been rotated to the position at which the coupling means between them is just about to be uncoupled.
Figure 8:
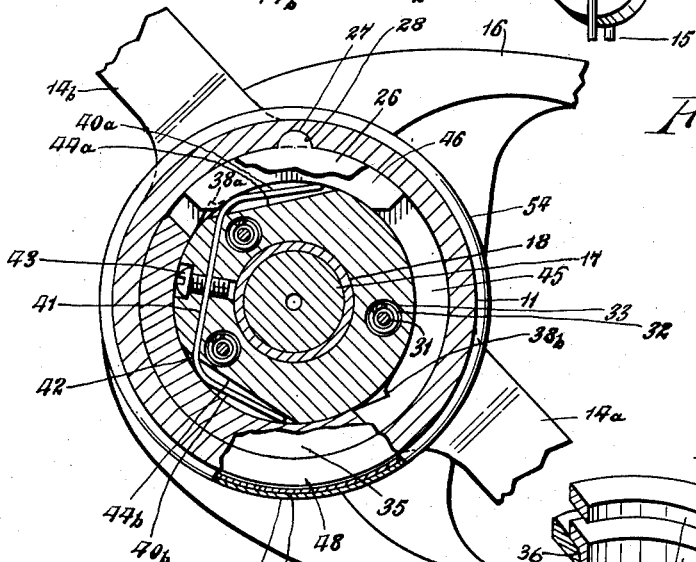
Fig. 8 is a fragmentary, horizontal section thru the wheel assembly, similar to Figs. 5 and 7 but with the steering arms and fork rotated still further than in Fig. 7 and with the coupling means between them completely uncoupled.
Figure 9:
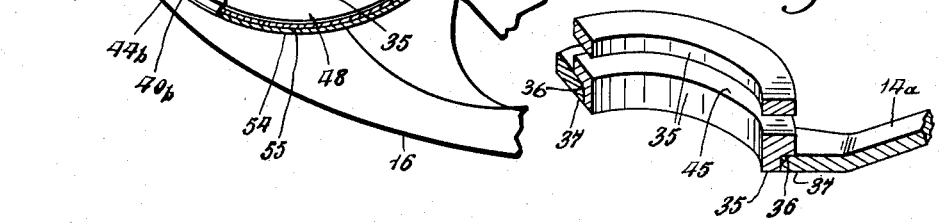
Fig. 9 is a fragmentary, perspective view of a portion of the steering collar and a portion of one of the steering arms secured by brazing thereto.
Figure 10:
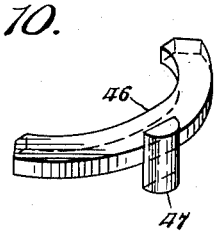
Fig. 10 is a perspective view of the uncoupling cam with its integral boss which holds it in position in the bracket.

As illustrated, the steering arms 14a and 14b are shown connected by spring connectors 15 to a rudder horn (not shown) which is secured to the rudder shaft of the airplane, so that when the airplane pilot turns the rudder from its central position to, for example, its extreme left steering position, the steering arms 14a and 14b and the fork 16 are turned from the position of Fig. 5 to that of Fig. 7. If the tail of the plane is now manually caused to be swung around still further in the same direction, the steering arms will remain as they are in Fig. 7 but the fork 16 will have been moved to some such position as that shown in Fig. 8.

This action results from the automatic uncoupling of the fork 16 from the steering arms 14a, 14b, as will now be described in detail.

Shrunk fitted into the rear end or hub of the bracket 11 is a vertical, depending spindle 17 whose central portion is received within the bore of a bushing 18 which is press fitted into the upper, forward end of the fork 16. The latter is bifurcated, as shown in Fig. 2, the lower, rear ends of the two prongs of the fork being connected by a horizontal, transverse axle bolt 20 upon the central portion of which is journalled a wheel 21.

For purposes of adjustment, and to carry the downward thrusts imposed upon the spindle 17, a tapered roller bearing 22 is interposed between the fork 16 and the spindle 17, adjustment being effected by a castel nut 23 which is threaded onto the lower end of said spindle 17. A metalencased, felt dust seal 24 is preferably arranged below the roller bearing 22 to prevent dust and dirt working up into said roller bearing from below.

It is to be noted that the spindle 17 is secured to the bracket 11 and not, in the conventional manner, to the fork 16. This enables said fork to be machined more easily and renders the spindle 17 to be, in effect, a part of the relatively simple bracket 11 and hence more easily machined than if it (the spindle 17) were a part of the relatively difficult-to-machine fork 16.

The bracket 11 is counterbored from the underside at 25 and receives, at its extreme upper end, a friction plate 26 (preferably constructed of "micarta" or the like), which is restrained against rotation by a semicircular tongue 27 engaging a semi-cylindrical keyway 28. Slidably received within the counter-bore 25 and resiliently bearing against the lower face of said friction plate 26 is an anti-shimmy plate 30 which is provided with three depending pins 31 which are slidably received within the bores of companion compression springs 32. The latter are slidably received within companion, cylindrical, spring sockets 33, the bore of each of which is just slightly greater than the outer diameter of its companion spring 32. By this arrangement the anti-shimmy plate 30 is resiliently pressed upwardly against the friction plate 26 but is prevented from rotating, to any material extent, relatively to the fork 16. This imposes a constant frictional resistance to shimmy which is not materially changed even after the friction plate 26 has become considerably worn. And if excessive wear should occur in time, the parts are very easily replaced.

Arranged within said counterbore 25 but journalled at 34 on the upper part of the fork 16 is a tubular steering collar 35 which is brazed at 36 to the ring-shaped flange 37 formed integrally with the steering arms 14a, 14b. The bore of this steering collar is provided with a pair of V-shaped notches 38a, 38b which normally engage the distal ends of what may be termed pawls 40a, 40b constituted of the outer ends of a U-shaped spring 41 the central, flat part of which is received within a slot 42 formed in the fork 16 and secured to said fork by a screw 43. To permit these pawls 40a, 40b to move inwardly, and to thereby become disengaged from the notches 38a, 38b, the upstanding, annular portion of the fork 16 is flattened at 44a and 44b.

The curved portions of the U-shaped spring 41 are normally in light contact with the bore of the steering collar, so that, when the one or other of the outer ends of said spring 41 is subjected to a heavy compressive force, the entire force is carried by the flat part of that outer end of the spring which is carrying the compressive load and no shear occurs at the points where the opposite ends of said spring enter the slot 42.

The steering collar 35 is provided, intermediate its length, with an annular segmental slot 45 which receives an arcuate cam 46. The latter is restrained against rotative movement, relatively to the bracket 11, by the provision of a semi-cylindrical, integral key 47 which is received within the aforementioned semi-cylindrical keyway 28 of the bracket 11. The opposite, inner corners of this cam 46 are bevelled so as to easily push inwardly the distal ends of the pawls 40a, 40b whenever the fork 16 moves from the position of Fig. 7 toward the position of Fig. 8, thereby uncoupling said fork from the steering collar 35 and enabling said fork to full swivel without any further movement of the steering arms 14a, 14b.

The pawls 40a, 40b (of U-shaped spring 41), together with the notches 38a, 38b of steering collar 35 constitute a coupling between the fork 16 and the steering arms 14a, 14b. The energy for effecting the uncoupling, however, derives from the movement of said fork relatively to the bracket 11. In other words, the force necessary to effect the uncoupling does not flow thru the coupling between the fork 16 and the steering arms, and hence this coupling carries the pressure imposed by the fork upon the steering arms without being additionally burdened by the pressure necessary to effect the uncoupling. This is believed to be novel.

Interposed between the flange 37 of the steering arm assembly and the bracket 11 is an upper thrust washer 48 which is restrained against rotation, relatively to the bracket 11, by being semi-cylindrically notched out at 50 to receive the semi-cylindrical key 47 of the cam 46. A lower thrust washer 51 is also provided between the flange 37 of the steering arm assembly and the fork 16, the same being received within an annular groove or rabbet 52 on the fork and being prevented from rotating, relatively to said fork by a pin 53 in said fork.

Suitable upper and lower, overlapping, annular dust collars 54 and 55 are also provided to prevent the intrusion of dust at this point.

We claim as our invention:

1. An airplane wheel assembly of the character described comprising: a bracket connected with the airplane fuselage; a fork pivotally connected with said bracket, and having a wheel journalled thereon; a steering collar movably mounted on said fork and having a steering arm; a pair of oppositely facing pawls movably mounted on said fork, and normally engaging companion notches in said steering collar; and means connected with said bracket and adapted to disengage the one or other of said pawls from its companion notch.

2. An airplane wheel assembly of the character described comprising: a bracket connected with the airplane fuselage; a fork pivotally connected with said bracket, and having a wheel journalled thereon; a steering collar movably mounted on said fork and having a steering arm; a pair of oppositely facing pawls constructed of a single U-shaped spring whose central portion is fastened to said fork and whose opposite tongues normally engage companion notches in said steering collar; and means connected with said bracket and adapted to disengage the one or other of said tongues from its companion notch.

3. An airplane wheel assembly of the character described comprising: a bracket connected with the airplane fuselage; a fork journalled on said bracket, and having a wheel journalled thereon; a steering collar journalled on said fork and having a steering arm and a pair of notches; a pair of pawls adapted to normally engage with said notches and constructed of a U shaped spring whose central portion is fastened to said fork; and a two-faced cam connected with said bracket and adapted to unlatch the one or other of said pawls.

4. An airplane wheel assembly of the character described comprising: a bracket connected with the airplane fuselage; a fork journalled on said bracket, and having a wheel journalled thereon; a steering collar journalled on said fork and having an arcuate slot and a steering arm and a pair of notches; a pair of pawls movably connected with said fork and adapted to normally engage said notches; and a two-faced cam arranged in said slot and adapted to unlatch the one or other of said pawls.

5. An airplane wheel assembly of the character described comprising: a bracket connected with the airplane fuselage and having a keyway; a friction plate arranged in said bracket and having a tongue engaging said keyway; a fork pivoted on said bracket and having a wheel journalled thereon; an anti-shimmy plate movably connected with said fork and frictionally engaging said friction plate; a steering collar journalled on said fork and having a steering arm and a pair of notches; a pair of pawls movably connected with said fork and normally engaging said notches; and a cam having a lug also engaging aforesaid keyway and adapted to unlatch the one or other of said pawls from its companion notch when the fork is rotated a sufficient amount.

6. An airplane wheel assembly of the character described comprising: a bracket connected with the airplane fuselage and having a keyway; a fork pivoted on said bracket and having a wheel journalled thereon; a steering collar journalled on said fork and having a steering arm and a pair of notches; a pair of pawls movably connected with said fork and normally engaging said notches; a cam having a lug engaging aforesaid keyway and adapted to unlatch the one or other of said pawls; and a thrust washer interposed between said steering collar and said bracket and having a slot which receives the lug of the cam.

7. An airplane wheel assembly of the character described comprising: a bracket connected with the airplane fuselage and having a keyway; a friction plate arranged in said bracket and having a tongue engaging said keyway; a fork pivoted on said bracket and having a wheel journalled thereon; an anti-shimmy plate movably connected with said fork and frictionally engaging said friction plate; a steering collar journalled on said fork; and having a steering arm and a pair of notches; pawls movably connected with said fork and normally engaging said notches; a cam having a lug also engaging aforesaid keyway, and adapted to unlatch the one or other of said pawls; and a thrust washer interposed between said steering collar and said bracket and having a slot which receives the lug of the cam.

8. An airplane wheel assembly of the character described comprising: a bracket connected with the airplane fuselage and having a keyway; a fork pivotally connected with said bracket and having a wheel journalled thereon; a steering collar journalled on said fork, and having a steering arm, and interposed between said bracket and fork; pawls movably connected with said fork; and normally engaging companion notches in said steering collar; a cam adapted to unlatch the one or other of said pawls, and having a lug received within said keyway; a pin in said fork; and identical thrust washers above and below said steering collar, each thrust washer having a slot, the slot of the upper thrust washer receiving the lug of the cam and the slot of the lower thrust washer receiving the pin of the fork.

9. An airplane wheel assembly of the character described comprising: a bracket connected with the fuselage of an airplane; a friction plate secured to said bracket; a fork journalled on said bracket, and having a cylindrical spring socket, and having a wheel journalled thereon; a spring arranged in said socket, the outer diameter of said spring being only slightly less than the bore of said socket; and anti-shimmy plate in engagement with said friction plate; and a pin secured to said anti-shimmy plate and snugly received within the bore of said spring.

NORMAN C. KOESTER.
CHARLES D. CUPP.

REFERENCES CITED

The following references are of record in the file of this patent:

UNITED STATES PATENTS

| Number | Name | Date |
|---|---|---|
| 1,971,613 | Kindelberger | Aug. 28, 1934 |
| 2,338,572 | Corwin | Jan. 4, 1944 |
| 2,344,157 | Maule | Mar. 14, 1944 |
| 2,356,468 | Parker | Aug. 22, 1944 |
| 2,394,825 | Trader | Feb. 12, 1946 |
| 2,490,560 | Urquhart | Dec. 6, 1949 |
| 2,494,432 | Maule | Jan. 10, 1950 |

FOREIGN PATENTS

| Number | Country | Date |
|---|---|---|
| 915,565 | France | July 22, 1946 |